(12) United States Patent
Pham et al.

(10) Patent No.: US 9,815,542 B2
(45) Date of Patent: Nov. 14, 2017

(54) BODY FUEL TANK CRITICAL GAP MEASUREMENT AND VALIDATION TEMPLATE

(71) Applicant: The Boeing Company, Chicago, IL (US)

(72) Inventors: Rosemary D. Pham, Everrett, WA (US); John W. Taylor, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 300 days.

(21) Appl. No.: 14/791,632

(22) Filed: Jul. 6, 2015

(65) Prior Publication Data

US 2017/0008645 A1    Jan. 12, 2017

(51) Int. Cl.
| | | |
|---|---|---|
| B64C 1/06 | (2006.01) | |
| B64D 37/04 | (2006.01) | |
| B64F 5/10 | (2017.01) | |
| B64F 5/00 | (2017.01) | |

(52) U.S. Cl.
CPC .............. B64C 1/06 (2013.01); B64D 37/04 (2013.01); B64F 5/10 (2017.01); B64F 5/00 (2013.01)

(58) Field of Classification Search
CPC ... B64C 1/06; B64D 37/04; B64F 5/00; B64F 5/0009; B64F 5/10
USPC .... 33/600, 605, 606, 609, 613, 645, 501.45, 33/833; 116/208, 281, 283
See application file for complete search history.

(56) References Cited

U.S. PATENT DOCUMENTS

| | | | | |
|---|---|---|---|---|
| 444,077 | A * | 1/1891 | schroyer .................. | G08B 5/02 116/283 |
| 2,561,759 | A * | 7/1951 | Steczynski ............... | G01B 3/40 33/199 R |
| 2,579,832 | A * | 12/1951 | Kinch ...................... | G01B 3/40 33/199 R |
| 2,842,855 | A * | 7/1958 | Williams ................. | G01B 5/08 33/542 |
| 2,853,787 | A * | 9/1958 | Dyer ....................... | E21B 17/00 33/501 |
| 3,438,351 | A * | 4/1969 | Kirkwood ................ | D21D 1/30 116/208 |
| 4,279,214 | A * | 7/1981 | Thorn ..................... | F16D 66/02 116/208 |
| 4,356,636 | A * | 11/1982 | Roberts ................... | G01B 3/36 33/199 R |
| 4,835,873 | A * | 6/1989 | Weems .................... | F16B 7/182 33/21.3 |
| 4,841,224 | A | 6/1989 | Chalupnik et al. | |
| 4,989,537 | A * | 2/1991 | Hutchinson, Sr. ...... | F16D 66/02 116/208 |
| 4,991,310 | A * | 2/1991 | Melia ..................... | F16D 66/02 116/208 |
| 5,031,314 | A | 7/1991 | Berrong et al. | |
| 5,044,302 | A * | 9/1991 | Goldfein ................. | F16D 66/02 116/208 |
| 5,134,783 | A * | 8/1992 | Perry ...................... | G01B 3/48 33/199 R |

(Continued)

*Primary Examiner* — R. A. Smith
*Assistant Examiner* — Tania Courson
(74) *Attorney, Agent, or Firm* — Miller, Matthias & Hull LLP (57) ABSTRACT

A tank is coupled to a body assembly of the fuselage of an aircraft with a lug of the tank mounted on a pin coupled to a body assembly. The pin is marked using a special tool with a first location mark and a second location mark. The lug of the tank may be mounted on the pin. To verify that the tank is correctly located on the pin, the position of the lug may be compared to two marks disposed on the pin. When the respective marks are visible on either side of the lug, the tank is properly aligned on the pin and the tank can be secured to the body assembly. The process is particularly helpful when the pin is located in an area that is inaccessible for direct observation or measurement after the tank is in place.

19 Claims, 6 Drawing Sheets

(56) References Cited

U.S. PATENT DOCUMENTS

| | | | | |
|---|---|---|---|---|
| 5,140,932 A * | 8/1992 | Goldfein | ............... | F16D 66/02 |
| | | | | 116/208 |
| 5,226,509 A * | 7/1993 | Smith | ............... | F16D 66/02 |
| | | | | 116/208 |
| 5,244,061 A * | 9/1993 | Hoyt | ............... | B60T 17/221 |
| | | | | 188/1.11 W |
| 5,441,128 A * | 8/1995 | Hoyt | ............... | F16D 66/02 |
| | | | | 188/1.11 W |
| 5,492,203 A * | 2/1996 | Krampitz | ............... | B60T 17/228 |
| | | | | 116/208 |
| 5,943,784 A * | 8/1999 | Hiramine | ............... | G01C 15/02 |
| | | | | 116/DIG. 16 |
| 6,508,144 B1 * | 1/2003 | Vendetti | ............... | G05G 1/10 |
| | | | | 33/298 |
| 6,845,566 B1 * | 1/2005 | Clements | ............... | G01M 13/005 |
| | | | | 33/501.08 |
| 7,252,463 B2 * | 8/2007 | Valdez | ............... | E05D 11/0009 |
| | | | | 33/194 |
| 7,356,938 B2 * | 4/2008 | Brueckert | ............... | B23P 6/00 |
| | | | | 33/199 R |
| 8,387,758 B1 * | 3/2013 | Sawyer | ............... | B60T 17/221 |
| | | | | 188/1.11 L |
| 2004/0205977 A1 * | 10/2004 | Halliar | ............... | B60T 17/08 |
| | | | | 33/833 |
| 2006/0081030 A1 * | 4/2006 | Kuhman | ............... | G01N 3/56 |
| | | | | 73/7 |

* cited by examiner

BODY FUEL TANK CRITICAL GAP MEASUREMENT AND VALIDATION TEMPLATE

FIELD

This disclosure relates generally to aircraft manufacture and more particularly to locating a tank in a fuselage of an aircraft.

BACKGROUND

Aircraft are often provided with tanks in the main fuselage of the aircraft for holding various liquids, such as fuel or water. These tanks may be used to extend the range of the aircraft, for mid-air fueling of other aircraft, for transporting supplies to land operations, or other activities. Mounting such a tank in a body assembly, that is, a section of the fuselage, involves sliding the tank into place so that holes in mounting lugs on the tanks are placed over pins coupled to mounts of the body assembly. The tanks generally match the outline of the body so that there are often only a few inches or less of gap between the body assembly and the tank. Because of this, the far end of the tank and the far end mounts with their associated pins are not accessible after the tank is place.

The tank should be properly located with respect to the mounts, that is, that the tank lugs are preferably located within a narrow range of acceptable distances from the mounts brackets on their respective pins. However, because the far end, or distal end, pins and lugs are blocked by the tank itself, this critical distance cannot be measured directly by manufacturing personnel at the time of installation or verified by inspectors.

A prior art method of ensuring that the distal end lugs are properly located on their respective pins involves measuring a mounting gap on the proximal end of the fuel tank, using a specially manufactured caliper to measure a distance to the distal end lug, measuring a distance between body-assembly mounts, and mathematically calculating the mounting gap on the distal end. This process is time consuming and is susceptible to both measurement errors and calculation errors.

SUMMARY

In an embodiment, a method of attaching a tank with a lug onto a pin of a body assembly of an aircraft fuselage includes disposing a first location mark on the pin, disposing a second location mark on the pin, and mounting the lug onto the pin between the first location mark and the second location mark. The method may also include determining that the lug has no overlap with the first location mark and determining that the lug has no overlap with the second location mark. When no overlap exists, the method may further include attaching the tank to the body assembly.

In another embodiment, a fuselage of an aircraft may include a body assembly including a tank mount having a pin, the pin including a first indicator and a second indicator, the first indicator separate from the second indicator. The body may also include a tank having a lug, the lug placed on the pin so that the lug is between the first and second indicators and non-overlapping with either the first indicator or the second indicator.

In yet another embodiment, a method of mounting a tank in a body assembly of an aircraft fuselage includes coupling a lug of the tank to a pin of a mount of the body assembly, the pin having a first location mark and a second location mark. The method may include determining that the lug lies completely between the first location mark and the second location mark and may conclude by securing the tank to the body assembly when the lug lies completely between the location marks.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Tanks in airplane fuselage can carry tens of thousands of pounds of fuel or other liquids yet still must accommodate changes in temperature, changes in air pressure, and high G forces. To accommodate this potentially harsh environment, a tank may be mounted with lugs on pins rather than bolted directly to a body assembly of the fuselage. This lug and pin arrangement allows for a degree of expansion and contraction as the environment changes. However, the lug must be initially placed at a prescribed location on the pin with a high tolerance so that these expansion and contraction changes are fully accommodated. For example, if a tank is mounted at one end of the pin, expansion may damage the lug, the tank, or the tank mount on which the pin is located.

Figure 1:
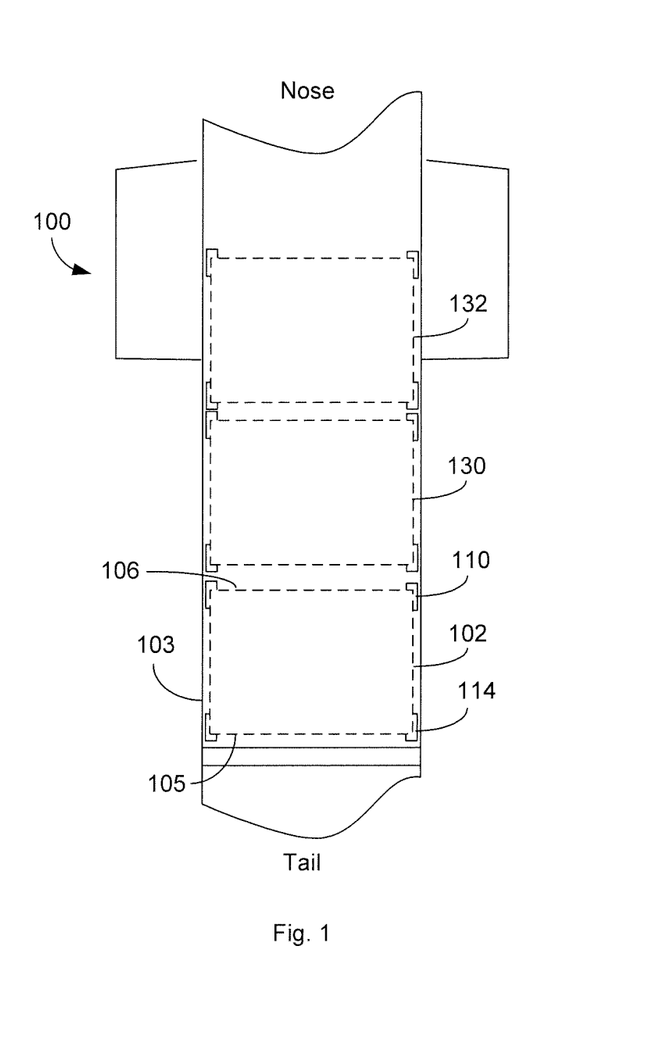
FIG. 1 is a top view of a portion of an aircraft.

FIG. 1 is a view of a portion of an aircraft 90 having a fuselage 100. The fuselage 100 includes a body assembly 103 and a tank 102 disposed inside the fuselage 100. The tank 102 has a distal end 105 and a proximal end 106. In the embodiment illustrate, the distal end 105 is facing rearward, or toward the tail-end of the fuselage 100. In such an embodiment, the tank 102 may be installed from the front. In other embodiments, the tank 102 may be mounted from the tail-end of the fuselage 100 so that the distal end 105 is forward of the proximal end 106. The problem remains the same in both embodiments, that is, that the distal end 105 is not accessible for visual inspection. In an embodiment, additional tanks 130 and 132 may be installed in addition to tank 102. The installation of these additional tanks may benefit from the techniques described below caused by obstructed access for inspection after installation.

Figure 2:
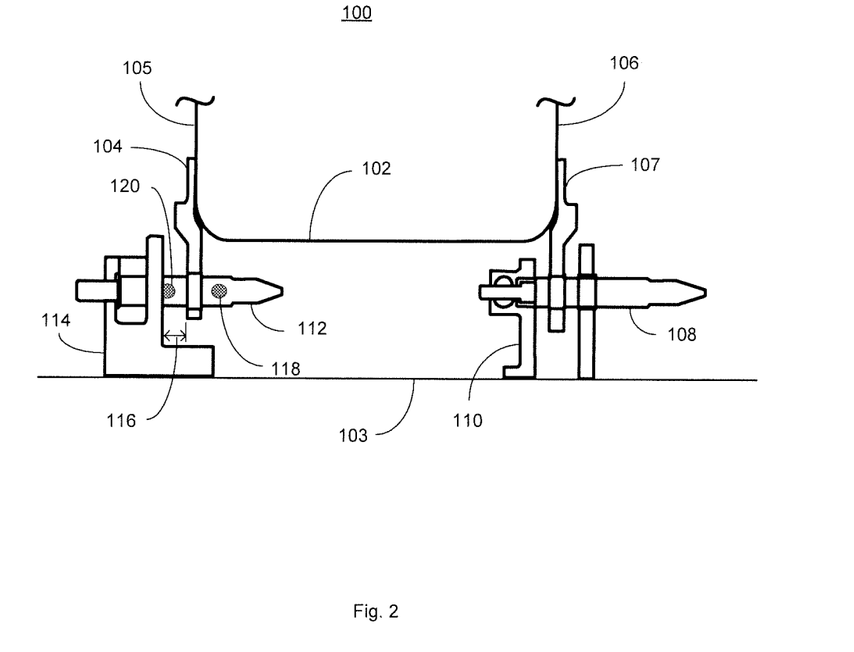
FIG. 2 is view of a section of a fuselage of the aircraft.

FIG. 2 is a view of a section of a fuselage 100 with a tank 102, such as a fuel tank, and a body assembly 103. The tank 102 may include lugs 104, 107, with the lug 104 at a distal end 105 of the tank 102 and the lug 107 at the proximal end 106 of the tank 102.

The body assembly 103 may include a proximal tank mount 110 with a pin 108. The lug 107 may be placed over the pin 108 to secure a portion of the proximal end 106 of the tank 102 to the body assembly 103. Similarly, a distal tank mount 114 holds a pin 112 onto which the lug 107 is placed to capture the far end 105 of the tank 102. The lug 104 must be a prescribed distance 116 from the tank mount 114 within a certain tolerance. In an embodiment which installs three consecutive body tanks, the prescribed distance is 0.6130 ±0.1250 for the most forward tank left hand side, 0.7413±0.1500 for right hand side; 0.6488±0.1500 for the mid tank left hand side, 0.7413±0.1500 for right hand; and 0.6488 ±0.1500 for the most aft tank.

A first location mark 118 and a second location mark 120 can be disposed on the pin 112 so that the distance 116, with allowable tolerances, lies between the two marks 118, 120. Because of the placement of the first location mark 118 and the second location mark 120, correct placement of the lug 104 may be verified visually by simply observing that the lug 104 is between the two marks 118 and 120 and has no overlap with either mark 118, 120. That is, if the lug 104 is touching either mark 118 or 120, the lug 104 and, therefore the tank 102, are incorrectly placed and an adjustment to the placement needs to be made before securing the tank 102.

Figure 3:
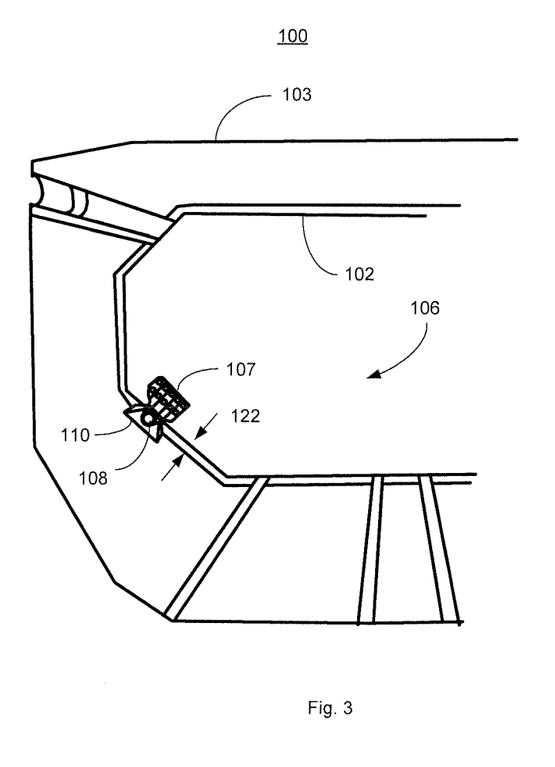
FIG. 3 depicts a view of the inside of the fuselage.

FIG. 3 depicts a view of the inside of the body assembly 103 looking toward the proximal end 106 of the tank 102. The proximal tank mount 110 is shown with the pin 108 coupling the lug 107. As is illustrated in FIG. 3, the distal end 105 of the tank 102 and its lug 104 are not accessible to a person because of the small size of the gap 122 between the tank 102 and the body assembly 103. This makes direct measurement of the distance 116 virtually impossible. Prior art attempts to take indirect measurements through the gap 122 were difficult and time consuming.

Figure 4:
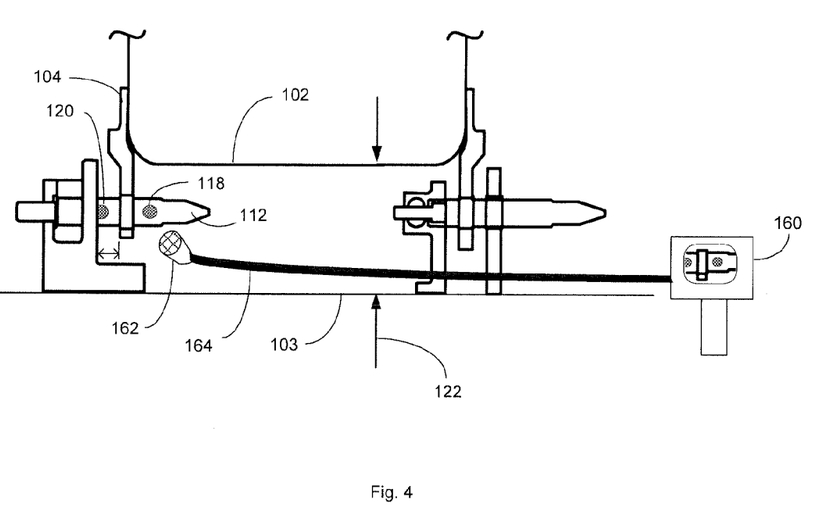
FIG. 4 illustrates the use of a remote camera in the fuselage.

FIG. 4 is illustrates the use of an instrument 160 with an image sensor 162 such as a camera attached to the instrument 160 via a cable 164. In an embodiment, the image sensor may be a boroscope that relays an optical image to the instrument 160. The image sensor 162 may be fed through the gap 122 to allow visual inspection of the location of the lug 104 on the pin 112 by allowing visual inspection of the location of the lug 104 relative to the first location mark 118 and the second location mark 120. In an embodiment, the camera may take a photograph or image of each side of the lug 104 to show whether there is any overlap of the lug 104 on either location mark 118, 120. When there is no overlap, the lug 104 is properly placed. The instrument 160 may be used again after the tank 102 is mechanically fixed to the body assembly 103 to verify that no shifting occurred during the attachment process. The instrument 160 may be capable of producing a photograph or image of lug placement. The instrument 160 may also be capable of storing and sending a copy of such a photograph or image to a quality control group or to a manufacturing database for archiving.

Figure 5:
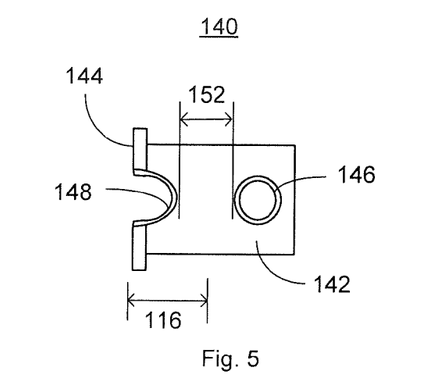
FIG. 5 is a top view of a tool in accordance with the current disclosure.
Figure 6:
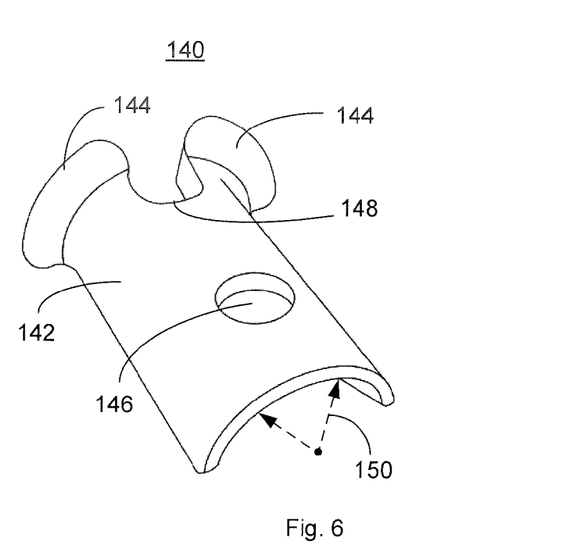
FIG. 6 is a perspective view of the tool of FIG. 5.
Figure 7:
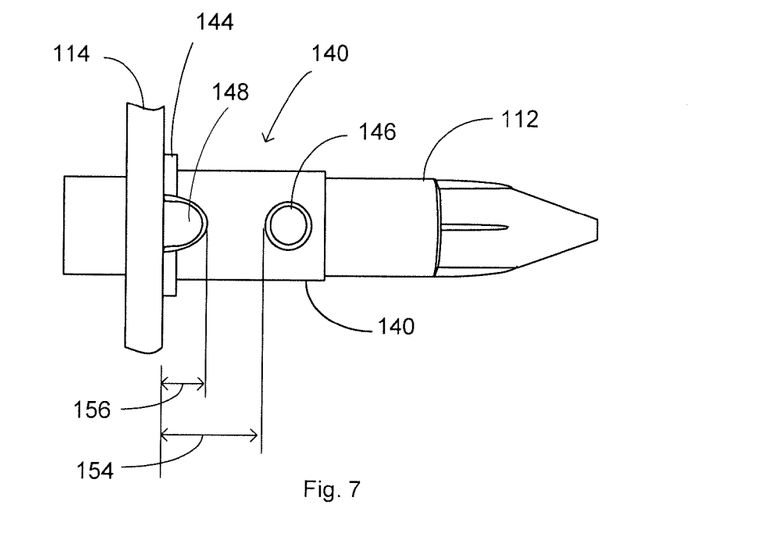
FIG. 7 is a top view of the tool of FIG. 5 placed on a pin of a mount.

FIGS. 5-7 depict a tool 140 that may be used to mark the pin 112 with the first location mark 118 and the second location mark 120. FIG. 5 is a top view of the tool 140. The tool 140 may include a base 142 and a flange 144. In the embodiment illustrated, a first aperture 146 may be formed in the base 142. The flange 144 may be split at the base 142 to form a second aperture 148. A span 152 between the apertures 146 and 148 is centered at the distance 116 and is as wide as the allowable tolerance for the placement of the lug 104. Other arrangements of apertures 146 and 148 may be used that meet the distance and tolerance requirements for the lug 104 to be properly placed during tank 102 assembly.

As illustrated in the perspective view of the tool 140 in FIG. 6, the base 142 may be a cylindrical section with an inside radius 150 that generally matches an outer radius of the pin 112 so that the tool 140 rests snugly on the pin 112 during use. Each mounting point for each tank 102, 130, 132 may require a separate tool due to variations in specified gap distances and tolerances. In this case, the tool 140 may include markings (not depicted) to indicate for which specific pin the tool 140 is designed for.

FIG. 7 shows the tool 140 coupled to the pin 112 with the flange 144 placed against a face of the distal tank mount 114. In this position, the first and second location marks 118, 120 can be marked using a special permanent ink on the pin 112 through the apertures 146 and 148, respectively. Other marking techniques such as painting, scoring, or etching may be used. A distance 154 is a nominal mounting distance plus acceptable tolerance for placing the lug 104. A second distance 156 is the nominal mounting distance minus the acceptable tolerance. After the marks 118, 120 are in place, the tool 140 may be removed and the tank 102 may be placed on the pin 112 as discussed above.

Figure 8:
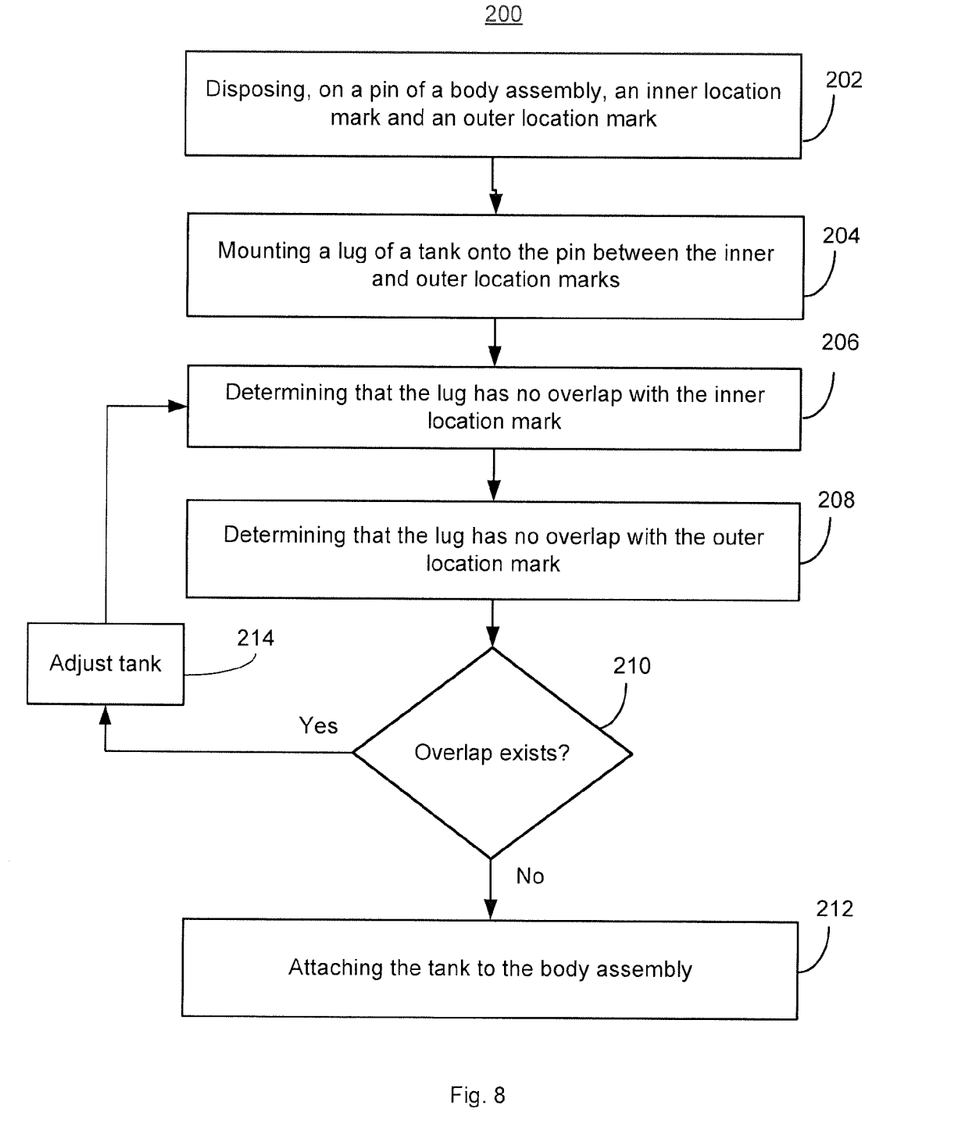
FIG. 8 is an illustration of operations performed by one embodiment of mounting a tank to a body assembly in accordance with the current disclosure.

FIG. 8 is a flowchart 200 of a method of attaching a tank 102 having a lug 104 onto a pin 112 of a body assembly 103. At block 202, a pin 112 of a tank mount 114 of a body assembly 103 may be marked with a first location mark 118 and a second location mark 120. The marks 118, 120 may be made by marking with a permanent ink using a suitable marker or may be painted, for example, using a spray paint. The location of the marks 118, 120 may be set using a tool 140. The tool 140 may be placed on the pin 112 with a flange 144 of the tool 140 seated against the rear tank mount 114. After the first location mark 118 and the second location mark 120 are placed using the apertures 146 and 148, respectively, the tool 140 may be removed prior to installation of the tank 102.

In other embodiments, the marks 118, 120 may be labels placed on the pin. In yet another embodiment, the marks 118, 120 may be etched or milled onto a surface of the pin 112 either prior to or after assembly in the distal tank mount 114.

At block 204, a lug 104 of the tank 102 may be mounted on to the pin 112 so that the lug 104 is between the first location mark 118 and the second location mark 120.

A determination may be made that the lug 104 is not overlapped with the first location mark 118 at block 206. As discussed above, an image sensor 162 such as a camera or boroscope may be fed through the gap 122 between tank 102 and the body assembly 103 to determine the placement of the lug 104 relative to the first location mark 118.

At block 208, a determination may be made that the lug 104 is not overlapped with the second location mark 120. This may require some adjusting of the location of the image sensor 162 compared to determining if there is no overlap with the first location mark 118. If, at block 210 the lug 104 overlaps either location mark 118, 120 based on the determinations at blocks 206 and 208, the process may follow the 'yes' branch continue at block 214 and the tank 102 may be adjusted to correct the placement of the lug 104 on the pin 112 between the two location marks 118, 120. If, at block 210, no overlap exists, execution may take the 'no' branch block 212 and the tank 102 may be attached to the body assembly 103 using struts or other mechanisms (not depicted). In some embodiments, the location of the lug 104 may be re-confirmed after the tank 102 is attached to the body assembly 103.

The ability to make a simply visual inspection of the placement of the tank lug 104 on the pin 112 improves manufacturing cycle time and reduces the possibility of making an error in measurement or calculation compared to the previous process. The ability to photograph the placement provides a mechanism to use photographic evidence to document proper placement of the tank 102 by either manufacturing or quality control personnel. The use of a simple tool 140 for providing the marks 118 and 120 increases reliability and accommodates, through the use of multiple tools, changes for different tank types and mounting requirements.

While only certain embodiments have been set forth, alternatives and modifications will be apparent from the above description to those skilled in the art. These and other alternatives are considered equivalents and within the spirit and scope of this disclosure and the appended claims.

What is claimed:

1. A method of attaching a tank with a lug onto a pin of a body assembly of an aircraft fuselage, the method comprising:
   disposing a first location mark on the pin;
   disposing a second location mark on the pin;
   mounting the lug onto the pin between the first location mark and the second location mark;
   determining that the lug has no overlap with the first location mark;
   determining that the lug has no overlap with the second location mark;
   adjusting a location of the tank relative to the body assembly when the lug overlaps one of the first location mark or the second location mark; and
   attaching the tank to the body assembly.

2. The method of claim 1, further comprising attaching a tool to the pin, the tool having a first aperture and a second aperture.

3. The method of claim 2, wherein disposing the first location mark comprises marking the pin at the first aperture, and wherein disposing the second location mark comprises marking the pin at the second aperture.

4. The method of claim 3, further comprising removing the tool prior to installation of the tank and after disposing the first and second location marks on the pin.

5. The method of claim 2, wherein attaching the tool to the pin comprises:
   seating a base of the tool against an attachment point of the pin; and
   seating a first surface of the tool against a second surface of the pin, the first surface of the tool and the second surface of the pin having an approximately equal curvature.

6. The method of claim 1, wherein determining that the lug has no overlap with the first location mark and has no overlap with the second location mark comprises:
   positioning an image sensor at the lug between the body assembly and the tank; and
   using an image of the pin and the lug to determine a location of the lug relative to the first location mark and to the second location mark.

7. A fuselage having the tank and the body assembly manufactured according to the method of claim 1.

8. A fuselage of an aircraft comprising:
   a body assembly including a tank mount having a pin, the pin including a first indicator and a second indicator, the first indicator separate from the second indicator; and
   a tank having a lug, the lug placed on the pin so that the lug is completely between the first and second indicators and non-overlapping with either the first indicator or the second indicator.

9. The fuselage of claim 8, wherein the first indicator and the second indicator are additive markings.

10. The fuselage of claim 9, wherein the additive markings are permanent ink.

11. The fuselage of claim 9, wherein the additive markings are paint.

12. The fuselage of claim 8, wherein the first indicator and the second indicator are labels.

13. The fuselage of claim 8, wherein the first indicator and the second indicator are one of an etched surface or a milled surface of the pin.

14. A method of mounting a tank in a body assembly of a fuselage, the method comprising:
   coupling a lug of the tank to a pin of a mount of the body assembly, the pin having a first location mark and a second location mark;
   determining that the lug lies completely between the first location mark and the second location mark; and
   securing the tank to the body assembly when the lug lies completely between the first location mark and the second location mark.

15. The method of claim 14, further comprising:
   disposing the first location mark at a first distance from a base of the pin; and
   disposing the second location mark at a second distance from the base of the pin.

16. The method of claim 15, further comprising:
   attaching a tool to the pin, the tool including a flange that aligns with the base of the pin, a body having a first aperture that corresponds to the first distance and a second aperture that corresponds to the second distance, wherein disposing the first location mark includes marking the pin at the first aperture and disposing the second location mark includes marking the pin at the second aperture.

17. The method of claim 15, wherein disposing the first location mark and the second location mark comprises marking the pin with a permanent ink at both the first location mark and the second location mark.

18. The method of claim 14, wherein determining that the lug lies completely between the first location mark and the second location mark comprises:
   inserting an image sensor through a gap between the tank and the body assembly to the mount of the body assembly; and
   verifying via the image sensor that the lug lies completely between the first location mark and the second location mark.

19. The method of claim 18, wherein the image sensor is one of a camera or a boroscope and verifying via the image sensor that the lug lies completely between the first location mark and the second location mark comprises verifying using an image of the lug and the pin captured with the image sensor that the lug is between and non-overlapping with the first location mark and the second location mark.

* * * * *